United States Patent [19]

Kobayashi

[11] 4,290,312

[45] Sep. 22, 1981

[54] SIGNAL GENERATOR FOR ELECTROMAGNETIC FLOWMETER

[75] Inventor: Tamotsu Kobayashi, Yokohama, Japan

[73] Assignee: Hokushin Electric Works, Ltd., Tokyo, Japan

[21] Appl. No.: 114,413

[22] Filed: Jan. 22, 1980

[30] Foreign Application Priority Data

Jan. 26, 1979 [JP] Japan .................................. 54-7025

[51] Int. Cl.³ .............................................. G01F 1/58
[52] U.S. Cl. .................................................. 73/861.12
[58] Field of Search ............ 73/861.12, 861.15, 861.16

[56] References Cited

U.S. PATENT DOCUMENTS

2,733,604  2/1956  Coulter ............................. 73/861.12
3,589,186  6/1971  Bourg et al. ..................... 73/861.16

FOREIGN PATENT DOCUMENTS

1111981  5/1968  United Kingdom ............. 73/861.12

*Primary Examiner*—Charles A. Ruehl
*Attorney, Agent, or Firm*—Michael Ebert

[57] ABSTRACT

A signal generator for reducing the influence of fluctuations in flow rate distribution in a fluid passing through the flow tube of an electromagnetic flowmeter, which fluid intercepts a magnetic field therein to induce an emf which is transferred to the meter electrodes, thereby yielding a signal as a function of flow rate. To this end, the tube is provided with auxiliary electrodes disposed at arbitrary positions at which the potentials developed thereon are equal to each other when the existing flow rate distribution is symmetrical with respect to the flow tube axis, the auxiliary electrodes being interconnected.

3 Claims, 4 Drawing Figures

SIGNAL GENERATOR FOR ELECTROMAGNETIC FLOWMETER

BACKGROUND OF INVENTION

This invention relates generally to electromagnetic flowmeters, and more particularly to a signal generator arrangement adapted to lessen the influence of fluctuations in the flow rate distribution of a fluid passing through a flow tube on the signal electromotive force.

Generally, even if a fluid passing through a flow tube of an electromagnetic flowmeter and intercepting a magnetic field established in the tube undergoes substantial changes in its flow rate distribution, such as a change from the state of a laminar flow to the state of a turbulent flow, this does not give rise to an error in the signal electromotive force induced therein as long as the flow of fluid is symmetrical with respect to the central axis of the flow tube. In the case, however, of an ordinary flow rate distribution wherein fluid flow is not symmetrical with respect to the central axis of the tube, an error is introduced in the signal electromotive force.

To avoid this, the general practice in the prior art is to reduce the error in the signal electromotive force by setting up a magnetic field with a special field distribution, or by making the area of each detecting electrode large relative to the diameter of the flow tube. When a capacitance-detecting type of electromagnetic flowmeter is used to detect the signal electromotive force via a capacitance between the fluid and the detecting electrodes, this meter requires that the electrodes be large. As a consequence, a flowmeter arrangement of this type is not readily affected by asymmetries in the flow rate distribution. These facts are well known in the art.

But as a practical matter, it is not always easy to provide a special magnetic field distribution, and there are other limitations in known expedients for preventing the influence of the flow rate distribution on the induced signal. Moreover, enlargement of the detecting electrode areas introduces difficulties in mounting the electrodes on the flow tube and in sealing off the fluid. There is also the problem of zero drift which is caused by the passage of eddy currents through the detecting electrodes due to a transformer electromotive force generated in the fluid by a magnetic field applied thereto.

Furthermore, in the case of a capacitance-detecting type flowmeter, since the electrostatic capacitance between fluid and the detecting electrode is very small, the output impedance becomes very high. This in turn leads to complexities in the electrode structure and in the detection of the signal electromotive force. Accordingly, the capacitance detecting type flowmeter is not always suitable for the purpose of lessening the influence of the flow rate distribution on the induced signal. Thus the various measures heretofore employed for suppressing the influence of the flow rate distribution on the induced signal have shortcomings of their own.

SUMMARY OF INVENTION

In view of the foregoing, the main object of this invention is to provide an arrangement for lessening the influence of fluctuations in the flow rate distribution of a fluid passing through the flow tube on the induced signal emf which overcomes the drawbacks of prior art arrangements.

Briefly stated, in the present invention, auxiliary electrodes are mounted on the inner wall of the flow tube at two given points which become equipotential when the flow of fluid is symmetrical with respect to the axis of the tube. The auxiliary electrodes are interconnected electrically so that when the fluid ceases to be symmetrical with respect to the axis of the tube, a potential difference is developed between the two given points which is short-circuited to cause the potential distribution in the tube to assume a distribution close to that encountered with a flow tube that is symmetrical with respect to the axis of the tube, thereby alleviating the error.

OUTLINE OF DRAWINGS

For a better understanding of the invention as well as other objects and further features thereof, reference is made to the following detailed description to be read in conjunction with the accompanying drawings, wherein:

FIG. 1 schematically illustrates one embodiment of in invention;

DESCRIPTION OF INVENTION

Figure 1:
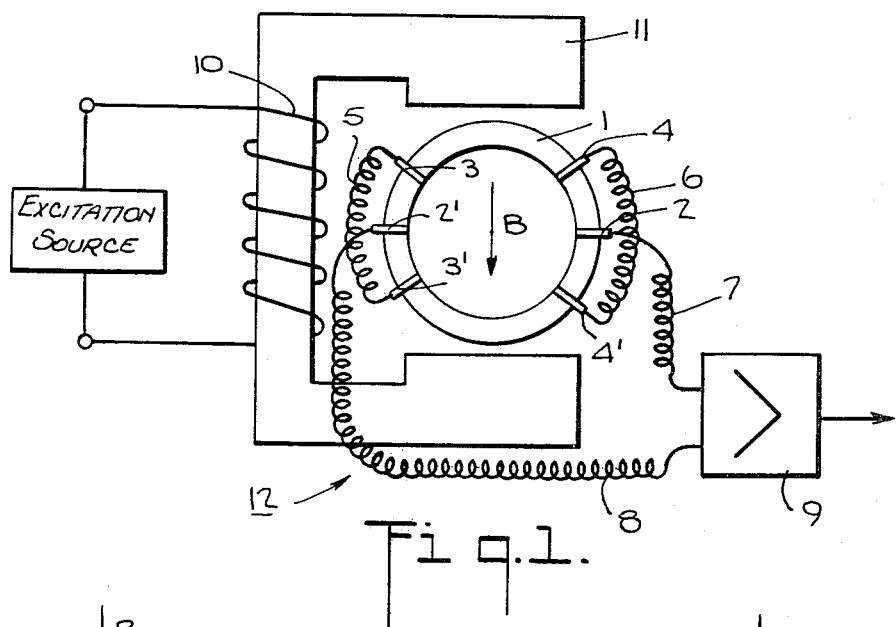

In FIG. 1, reference numeral 1 indicates an inner wall insulated flow tube of an electromagnet flowmeter through which a fluid to be metered is conducted. The flow tube 1 has mounted thereon a pair of detecting electrodes 2 and 2' for detecting the flow rate signal electromotive force. These electrodes are insulated from tube 1 but make contact with the fluid to be measured.

In addition, two pairs of auxiliary electrodes, 3, 3' 4, 4' are mounted on the inner wall of the flow tube 1 at those positions thereon where the potentials become equal to each other when the flow of fluid is symmetrical with respect to the axis of tube 1. Auxiliary electrodes 3 and 3' are interconnected via a lead wire 5, and the electrodes 4 and 4' are likewise interconnected via a lead wire 6.

Detecting electrodes 2 and 2' are respectively connected via a signal lines 7 and 8 to a converter 9 for converting the flow rate signal electromotive force into a voltage or current suitable for further processing in accordance with well-known techniques.

Also provided in the signal generator 12 is an excitation coil 10 for applying a magnetic field B to the flow tube 1, the coil being wound about a core 11 for establishing a magnetic flux extending through the flow tube to be intercepted by the fluid being metered.

Figure 2:
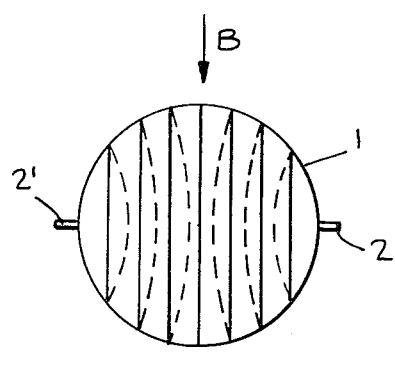
FIG. 2 illustrates diagrammatically the distribution of equipotential lines in the flow tube in the case of a homogeneous magnetic field.

We shall now explain why the signal generator in accordance with the present invention is not readily affected by the flow rate distribution. For convenience of explanation, a description will be made first of a situation in which the magnetic field B is homogeneous. FIG. 2 shows the distribution of equipotential lines of the signal electromotive force in the flow tube when the magnetic field is homogeneous. In FIG. 2, the solid lines show the distribution of equipotential lines when the fluid in the tube flows at the same flow rate at respective points in the section of the tube. In this situation, the equipotential lines are parallel to one another. But in the case of a laminar flow, the equipotential lines are curved, as indicated by the broken lines. Accordingly, in the situation of an ordinary flow that is symmetrical with respect to the axis of the flow tube, the equipotential lines come to lie midway between the solid and the broken lines. The above fact is well known in the art.

Figure 3:
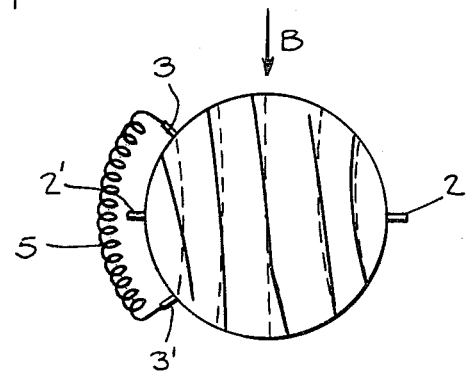
FIG. 3 is a diagram showing the distruibution of equipotential lines when the fluid is symmetrical with respect to the flow tube axis.

In contrast thereto, when the flow is asymmetrical with respect to the axis of the flow tube, the equipotential lines are distributed irregularly, as indicated by the solid lines in FIG. 3, the nature of the irregularity depending on the state of flow. Then, if the auxiliary electrodes 3 and 3' are disposed at the positions shown in FIG. 3 at which the potentials become equal to each other when the flow is symmetrical with respect to the axis of the flow tube, a potential difference occurs between the auxiliary electrodes 3 and 3' due to irregularity of the flow. Hence if the auxiliary electrodes 3 and 3' are short-circuited via the lead wire 5, then both electrodes are rendered equipotential, which corrects the equipotential lines, as indicated by the broken lines in FIG. 3. This results in an equipotential line distribution close to that encountered when the flow is symmetrical with respect to the axis of the flow tube. As a consequence, the distribution of equi-potential lines for the detecting electrodes are similarly corrected. Hence, the error of the signal electromotive force due to the influence of the flow rate distribution on the induced signal is also alleviated.

In the embodiment shown in FIG. 3, the auxiliary electrodes are disposed only on the left-hand side of the tube. But by providing auxiliary electrodes 4 and 4' also on the right-hand side and interconnecting them electrically as shown in FIG. 1, the above-noted error will be further reduced.

The foregoing description has been given in respect of the case of a homogeneous magnetic field; but in the case of an inhomogeneous magnetic field, even if such auxiliary electrodes are disposed at positions symmetrical with respect to the plan in the axial direction of the flow tube including the line connecting the pair of detecting electrodes as described above, good results cannot always be obtained. In general, a plurality of auxiliary electrodes are disposed on the inner wall of flow tube 1 at arbitrary positions where potentials are equal to each other when the flow is symmetrical with respect to the axis of the tube 1, although the positions vary with the magnetic field distribution.

Even if a plurality of auxiliary electrodes are provided and electrically interconnected as described above, when the flow is symmetrical with respect to the axis of the flow tube, the auxiliary electrodes lie on equipotential lines, so that no adverse effect is produced on the signal electromotive force. Only when the flow becomes asymmetrical with respect to the axis of the flow tube is a potential difference generated between the auxiliary electrodes and short-circuited, by which arrangement it is possible to lessen the influence of the flow rate distribution on the signal electromotive force.

In the foregoing, the magnetic field is described in relation to its distribution. But it will easily be seen from the above that the present invention is similarly applicable not only to a magnetic field of the commercial power-line frequency but also to various magnetic fields of low frequencies, rectangular wave excitation frequencies and so forth.

Figure 4:
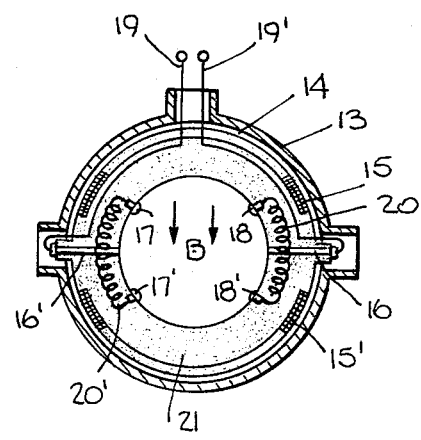
FIG. 4 shows an alternative way for interconnecting the auxiliary electrodes in a lined flow tube.

In the foregoing, the auxiliary electrodes are interconnected on the outside of the flow tube, but it is also possible to interconnect them in a lining material of the flow tube, as shown in FIG. 4. In FIG. 4, reference numeral 13 indicates a tubular casing; numeral 14 designates a core serving as a flux return path; numerals 15 and 15' identify excitation coils; numerals 16 and 16' denote detecting electrodes; numerals 17, 17', 18 and 18' represent auxiliary electrodes; numerals 19 and 19' represent signal leads; numerals 20 and 20' refer to wires interconnecting the auxiliary electrodes 18, 18' and 17, 17', respectively; and numeral 21 indicates a lining material laid on the inside of casing 13 to define the fluid passage.

The foregoing description involves embodiments in which one or two pairs of auxiliary electrodes are disposed in the section of the flow tube including the detecting electrodes. But in practice, the provision of more auxiliary electrodes as required is more effective; furthermore, if the auxiliary electrodes are disposed not only in the section of the flow tube including the detecting electrodes but also in other sections of the tube in its axial direction, more favorable results can be expected.

Further, the electrode configuration is not limited specifically to the point type shown but may also be in linear form having a limited length in the axial direction of the flow tube.

In summary, the present invention has the following advantages:

(1) The influence of flow rate distribution on various magnetic field distributions can be lessened effectively with a simple structure.

(2) By means of the present invention in combination with the conventional inhomogeneous magnetic field type electromagnetic flowmeter, it becomes possible to obtain a signal generator which is less affected by flow rate distribution.

(3) Since the auxiliary electrodes are not directly employed to measure the signal electromotive force, they do not constitute a factor increasing such instability as is caused by enlarging the areas of the detecting electrodes.

(4) As a result of the reduction of the influence of the flow rate distribution, the signal generator can be reduced in size in the axial direction of the flow tube and hence can be miniaturized. Thus, the present invention is of great utility in industrial applications.

While there has been shown and described a preferred embodiment of a signal generator for electromagnetic flowmeter in accordance with the invention, it will be appreciated that many changes and modifications may be made therein without, however, departing from the essential spirit thereof.

I claim:

1. In an electromagnetic flowmeter in which a fluid to be metered is conducted through a flow tube to intercept a magnetic field whereby an emf if induced in a pair of detecting electrodes at diametrically-disposed positions on the tube to yield a signal as a function of flow rate which is applied to a signal converter, a signal generator comprising:

A. a set of auxiliary floating electrodes associated with each of the detecting electrodes disposed on the inner wall of the flow tube at arbitrary positions thereon at which equal potentials are present when the fluid being metered assumes a symmetrical flow rate distribution with respect to the flow tube, said auxiliary electrodes being disconnected from the detecting electrodes and from said converter; and B. means electrically interconnecting the auxiliary electrodes of each set whereby these electrodes are rendered equipotential when the flow rate distribution is asymmetrical.

2. In a flowmeter as set forth in claim 1, wherein one set of said auxiliary electrodes is disposed adjacent one of the detecting electrodes on either side thereof and another set is disposed adjacent the other detecting electrode on either side thereof.

3. In a flowmeter as set forth in claim 1, wherein said tube is provided with an internal liner defining a flow passage for said fluid, said detecting and auxiliary electrodes being mounted on the liner in contact with the fluid and said means interconnecting said auxiliary electrodes are disposed in the space between the liner and the tube.

* * * * *